United States Patent
Ludwig (10) Patent No.: US 11,906,057 B2
(45) Date of Patent: Feb. 20, 2024

(54) MOTOR VEHICLE DIRECTIONAL VALVE FOR ADJUSTING A FLUID FLOW

(71) Applicant: WOCO Industrietechnik GmbH, Bad Soden-Salmünster (DE)

(72) Inventor: Uwe Ludwig, Bad Soden-Salmuenster (DE)

(73) Assignee: WOCO Industrietechnik GmbH, Bad Soden-Salmünster (DE)

( * ) Notice: Subject to any disclaimer, the term of this patent is extended or adjusted under 35 U.S.C. 154(b) by 55 days.

(21) Appl. No.: 17/566,168

(22) Filed: Dec. 30, 2021

(65) Prior Publication Data
US 2022/0213967 A1    Jul. 7, 2022

(30) Foreign Application Priority Data

Jan. 5, 2021   (DE) .................. 102021100068.8

(51) Int. Cl.
*F16K 11/076* (2006.01)
*F16K 1/24* (2006.01)

(52) U.S. Cl.
CPC .............. *F16K 11/076* (2013.01); *F16K 1/24* (2013.01)

(58) Field of Classification Search
CPC . F16K 1/24; F16K 11/076; F16K 5/14; F16K 5/184; F16K 5/204
USPC ........................................................ 251/163
See application file for complete search history.

(56) References Cited

U.S. PATENT DOCUMENTS 3,180,362 A * 4/1965 Muller ...................... F16K 1/24
                                                        251/188
7,032,883 B2 * 4/2006 Boardman ................ F16K 1/24
                                                        251/192

FOREIGN PATENT DOCUMENTS

| CN | 110173574 A | 8/2019 |
|---|---|---|
| CN | 110185812 A | 8/2019 |
| DE | 551 241 | 5/1932 |
| DE | 690270 C | 4/1940 |
| DE | 1176433 B | 8/1964 |
| DE | 102009049867 A1 | 4/2011 |
| DE | 102013105321 A1 | 11/2014 |
| DE | 20 2017 000 564 U1 | 4/2017 |
| DE | 102016118133 A1 | 3/2018 |
| EP | 2 314 900 A2 | 4/2011 |
| FR | 1 407 362 | 6/1965 |
| FR | 1407362 A | 7/1965 |
| WO | WO 2019/206510 A1 | 10/2019 |

OTHER PUBLICATIONS

FR1407362A Machine Translation (Year: 1965).*
Office Action dated Sep. 29, 2021 for German Patent Application No. 10 2021 100 068.8, (12 pp.), note: pp. 1 and 2 are English language Explanations to Section C. Result of Determination Document.

(Continued)

*Primary Examiner* — Michael R Reid
(74) *Attorney, Agent, or Firm* — Banner & Witcoff Ltd.

(57) ABSTRACT

A directional valve for adjusts a fluid flow, such as a coolant flow, is between at least two operating states. The valve includes a valve housing, an adjustable valve member, and a slotted link guide adapted to push the valve member into a sealing contact switching state with the valve housing and to guide the valve member into a releasing operating state shifted back with respect to the sealing contact operating state.

17 Claims, 5 Drawing Sheets

(56) References Cited

OTHER PUBLICATIONS

Office Action dated Sep. 21, 2021 for German Patent Application No. 10 2021 100 075.0, (8 pp.), note: pp. 1 and 2 are English language Explanations to Section C. Result of Determination Document.

* cited by examiner

MOTOR VEHICLE DIRECTIONAL VALVE FOR ADJUSTING A FLUID FLOW

RELATED APPLICATION

This application claims the benefit and priority of German Patent Application DE 10 2021 100 068.8, filed Jan. 5, 2021, which is incorporated by reference herein in its entirety.

TECHNICAL FIELD

The application relates to a directional valve, in particular a multi directional valve, such as a 3/2- or 4/2-directional valve, for adjusting a fluid flow, such as a coolant flow, for example of a motor vehicle. Furthermore, the application relates to a motor vehicle fluid flow control system, such as a motor vehicle thermal management system, having such a valve.

BACKGROUND

Manifold valves of similar kind are used, for example, in a motor vehicle for its thermal management and are used, in particular, to direct coolants, such as water or oils. In the case of known multi directional valves with rotary pistons as the valve member, there are sealing problems and high frictional forces between the valve member and the valve housing, in particular the valve seat. Therefore, relatively powerful actuators must be used to operate the valve members.

DE 10 2013 105 321A1 discloses a multi directional switching valve for adjusting a fluid flow. The multi directional switching valve has a piston that can be adjusted translationally in a valve housing and has a wavy outer contour. The valve housing has recesses in which sealing elements are movably arranged transversely to the piston axis. The sealing elements cooperate with the mountain sections of the wavy outer contour of the piston and are otherwise free of contact with respect to the outer contour of the piston.

The structural complex design of the multi directional switching valve, in particular for the realization of the piston, has proven to be disadvantageous. In addition, the assembly is complicated due to the large number of parts.

SUMMARY

It is an object of the present application to overcome the disadvantages of the prior art, in particular to improve a directional valve for a motor vehicle fluid flow in such a way that the frictional force between the valve member and the valve housing is reduced and/or lower power of the actuator for setting the directional valve is required, in particular without impairing the tightness of the directional valve.

Accordingly, a directional valve for adjusting a fluid flow, such as a coolant flow, between at least two operating states is provided. The directional valve may, for example, be a multi directional valve, such as a 3/2-directional or a 4/2-directional valve. The directional valve according to the embodiments is used, for example, in a motor vehicle for its thermal management. Accordingly, the directional valve may be a motor vehicle directional valve, in particular a motor vehicle thermal management valve, such as a motor vehicle coolant valve, which is used, for example, in a motor vehicle fluid flow control system, such as a motor vehicle thermal management control system, in particular a motor vehicle cooling circuit. The fluid flow may be, for example, coolant, water, oil or the like.

The directional valve according to the embodiments comprises a valve housing. The valve housing can delimit a valve chamber through which the fluid flow can be passed and/or in which a valve member can be movably mounted for setting the various operating states. The valve housing may comprise at least two, in particular three or four, fluid connections, such as openings or passages, in particular at least one fluid inlet and at least one fluid outlet.

Furthermore, the directional valve comprises an adjustable valve member. For example, the valve member may be coupled to an actuator, in particular in a power-transmitting manner, which is designed to actuate or position the valve member. The valve member may, for example, be a rotary piston rotationally mounted with respect to a rotational actuating axis. Furthermore, it is possible that the valve member is a piston translationally mounted with respect to an actuation axis.

In accordance with an aspect of the embodiments, the directional valve further comprises a slotted link guide configured to push the valve member into a sealing contact operating state with the valve body and to guide the valve member into a release operating state that shifted back with respect to the sealing contact operating state. When engaging the sealing contact operating state, the slotted link guide forces the valve member against the valve housing so that a static friction existing between the valve member and the valve housing is continuously increased in particular. For example, the sealing contact operating state is assigned to one of the fluid connections in the valve housing. When leaving the sealing contact operating state, the slotted link guide guides the valve member away from the valve housing, so that the static friction existing between the valve housing and the valve member is again reduced, in particular continuously.

An advantage of the embodiments is that a particularly low-friction movement of the valve member within the valve housing is made possible in a manner that is easy to construct and manufacture. In this respect, the directional valve according to the embodiments is characterized by low wear and durable long-life cycle. Due to the low frictional force during the positioning of the valve member, it is possible to use lower-cost and/or lower-power actuators for actuating the valve member. Provided that the sealing contact operating state is assigned to a fluid connection to be closed, the slotted link guide according to the embodiments fulfills two advantageous functions: on the one hand, a low-friction, guided movement of the valve member is made possible during the adjustment of the valve member and, on the other hand, an increased frictional force is built up via the slotted link guide for the fluid-tight closing of the corresponding fluid connection. Since a contact pressure between the valve member and the valve housing only occurs in the closing area, i.e. the sealing contact operating state, the actuating movement of the valve member is essentially frictionless, so that additional sliding and/or sealing measures are also unnecessary. Due to the guided movement during the positioning of the valve member by means of the slotted link guide, the valve member is quasi-automatically pushed into the sealing contact operating state with the valve housing in order to build up the contact pressure, in particular in the closing area for closing a fluid connection, and is also quasi-automatically guided back out of the sealing contact operating state.

In the case of a rotary piston that is rotationally mounted with respect to an axis of rotation, "pushing" can be understood to mean that the slotted link guide pushes the valve member radially outward out of the purely rotational translational movement in order to reach the sealing contact operating state with the valve housing, i.e. in order to overcome a radial distance between the valve member and the valve housing. The "moved back release state" may be understood to mean that the slotted link guide returns the valve member, particularly radially inward, to the substantially purely rotational actuating motion. With respect to the piston valve member embodiment, the slotted link guide can displace the valve member transversely, in particular perpendicularly, to the translational actuating movement in order to force it into the sealing contact operating state with the valve housing. When moving back out of the sealing contact operating state, the slotted link guide can guide the piston valve member back to the translational actuating movement direction or path.

In an exemplary embodiment of the embodiments, the slotted link guide has a slotted link path formed in the valve housing, particularly the valve housing base, in which the valve member is guided. For example, the slotted link path is made in one piece with the valve housing. When the valve member is set, it travels down the slotted link path respectively along the slotted link path, in particular between the at least two operating states, and during the setting movement in predetermined rotational or axial positions, depending on the valve member embodiment, is pushed into a sealing contact operating state and guided out of it again. The fact that the slotted link path can be arranged on the valve member housing or even formed integrally therewith provides a particularly structurally simple design of the slotted link guide.

According to an exemplary further development of the directional valve according to the embodiments, the slotted link path extends in such a way that, when engaging the sealing contact operating state, the valve member is deflected transversely with respect to its actuating axis in the direction of a sealing contact area of the valve housing, which can, for example, be defined and/or formed by a valve seat. In the case of a rotary piston valve member, the valve member can be deflected radially to the rotational actuation axis. In the case of a piston valve member, the piston valve member can be deflected transversely to the translation actuation axis. The sealing contact area of the valve housing can be formed by a valve seat, for example. For example, the valve seat is associated with a fluid connection.

According to a further exemplary further development of the directional valve according to the embodiments, the slotted link guide has a press-on protrusion which extends into the slotted link path, so that when the valve member travels over the press-on protrusion, for example when the valve member travels the press-on protrusion, the valve member is pushed by the press-on protrusion into the sealing contact operating state. Accordingly, the press-on protrusion can cause an evasive movement of the valve member, whereby a dimension of the press-on protrusion and thus a movement compensation of the valve member is matched to a distance to be bridged between the valve member and the valve housing, which must be overcome to engage the sealing contact operating state. For example, the slotted link guide can comprise two, three or four press-on protrusions arranged at a distance from each other. One press-on protrusion can be assigned to each fluid connection. In this way, it can be ensured that the slotted link guide of the valve member presses in the direction of the valve member in the area of a fluid connection in each case to form a sealing contact operating state in order to close the corresponding fluid connection in a fluid-tight manner. The sealing contact pressure between the valve member and the valve housing is therefore only built up in the corresponding sealing areas at the fluid connections, i.e. only when it is necessary. In the remaining range of actuating movement, in particular rotational or translational range of movement, of the valve member, this can run essentially friction-free.

According to a further exemplary embodiment of the directional valve according to the embodiments, the slotted link path is formed by a guide groove introduced into the valve housing, in particular in the valve housing base. Furthermore, the valve member has a guide protrusion acting as a sliding block and cooperating with the guide groove. When the valve member is set, the guide protrusion of the valve member is guided in the guide groove of the valve housing. In other words, the guide protrusion projects into or engages with the guide groove. A cross-section of the guide protrusion may be adapted to an inner cross-section of the guide groove shape.

In an exemplary further development of the directional valve according to the embodiments, the guide groove is essentially annular in shape with respect to the rotational actuation axis of the valve member, which is in the form of a rotary piston, and has a track switch, in particular two, three or four track switch distributed in particular uniformly in the circumferential direction, which deflects or pushes the valve member out of the annular, regular slotted link path in order to engage the sealing contact operating state. In the case of a translationally actuable piston valve member, the guide groove can be aligned essentially parallel to the translational actuation axis and have one, in particular two, three or four points distributed in the translational actuation direction, in particular uniformly, which deflects or displaces the piston valve member transversely to the translational actuation axis. The at least one track switch may further be shaped and/or ensure that the valve member is returned to the regular annular or regular linear actuating path.

According to another aspect of the embodiments, which may be combined with the preceding aspects and exemplary embodiments, there is provided a directional valve for adjusting a fluid flow between at least two operating states. The directional valve may be, for example, a multi directional valve, such as a 3/2-directional or a 4/2-directional valve. The directional valve according to the embodiments is used, for example, in a motor vehicle for its thermal management. Accordingly, the directional valve may be a motor vehicle directional valve, in particular a motor vehicle thermal management valve, such as a motor vehicle coolant valve, which is used, for example, in a motor vehicle fluid flow control system, such as a motor vehicle thermal management control system, in particular a motor vehicle cooling circuit. The fluid flow may be, for example, coolant, water, oil or the like.

The directional valve includes a valve housing. The valve housing can delimit a valve chamber through which the fluid flow can be passed and/or in which a valve member can be movably mounted for setting the various operating states. The valve housing may have at least two, in particular three or four, fluid connections, such as openings or passages, in particular at least one fluid inlet and at least one fluid outlet.

The directional valve further comprises a valve member. The valve member is adjustable, in particular, for setting the at least two operating states. It may be a rotary piston rotationally mounted with respect to a rotational adjustment axis or a slide valve adjustable along a translational adjustment axis. The valve member has an adjusting part to be connected to an actuator for actuating the valve member, in particular in a force-transmitting manner, and a sealing part for making sealing contact with the valve housing. The adjusting part and the sealing part can be separate, in particular separately manufactured, components.

According to the further aspect of the embodiments, the sealing part is movably supported relative to the adjusting part by means of a rail guide. The adjusting part may be the component directly actuated by the actuator, while the sealing part is mounted on the adjusting part without a separate adjusting part. A relative movement possibility of the sealing part relative to the adjusting part is made possible by means of the rail guide, which can be moved, for example, when the valve member is set, i.e., when the valve member is moved between the different operating states, between a sealing contact operating state in which the sealing part is positioned relative to the adjusting part by means of the rail guide in such a way that a particularly increased frictional contact is created between the valve member and the valve housing, in particular valve seat, for example in the area of a fluid connection. The rail guide makes it possible to decouple the actuator and the sealing part in a cost-effective and easy-to-implement manner, so that the rail guide can be used to flexibly adjust the relative movement of the adjusting part with respect to the sealing part in order to build up a desired sealing contact pressure at a specific position, in particular in a specific rotational position of the valve member or at a specific axial actuating position. Thus, a particularly low-friction engagement of the sealing contact within the valve housing can be made possible in a manner that is easy to construct and manufacture. In this respect, the directional valve according to the embodiments is characterized by low wear and durable long-life cycle. Due to the low frictional force when the sealing contact is engaged, less expensive and/or lower power actuators can be used for actuating the adjusting part.

In an exemplary embodiment of the directional valve according to the embodiments, the rail guide is implemented by a shape-corresponding protrusion-recess structure on the adjusting part and sealing part. The protrusion-recess structure may have engagement elements on the actuating member and sealing part that are associated with each other and/or shape-matched to each other in such a way that they can engage in each other to establish the relative mobility of the sealing part with respect to the actuating member.

In another exemplary embodiment, the valve member may have a sealing contact operating state in which the sealing part is in sealing contact with the valve body, and a release operating state that is recessed with respect to the sealing contact operating state in which the sealing part is moved away from the valve body. For example, the sealing part is pushed towards the valve housing to engage the sealing contact operating state. For example, the rail guide may form a type of gear. Accordingly, when engaging the sealing contact operating state, the sealing part can be pushed radially outwardly with respect to the rotational actuation axis or transversely with respect to the translational actuation axis, for example, so that a distance existing between the sealing part and the valve housing can be bridged, so that the sealing part can come into a press-on sealing contact with the valve housing. When moving away from the sealing contact operating state into the reset release operating state, the sealing part can be moved away from the valve housing again via the rail guide, so that a distance in this respect is produced and friction between the sealing part and the valve housing is reduced, in particular prevented.

According to an exemplary further development of the directional valve according to the embodiments, the sealing part is movably mounted on the control part in such a way that the sealing part is moved away from the valve housing when leaving the sealing contact, such as under the influence of the fluid pressure. Furthermore, it is possible that the sealing part is moved away from the valve housing via a guide device when leaving the sealing contact. As soon as the sealing part is moved away from the sealing contact in order to set a operating state of the directional valve in which a fluid flow through the directional valve is permitted, in particular through a fluid opening associated with the corresponding sealing contact, a fluid pressure builds up at the sealing part, which is shifted back by the latter as a result. The utilization of the fluid pressure has, among other things, the advantage that the fluid pressure that is present anyway can be used to set the release operating state, in particular without the need for further components, such as a spring preload, a separate gear or a separate moving means for the sealing part.

In another exemplary embodiment of the directional valve according to the embodiments, the axis or direction of movement of the sealing part is oriented substantially perpendicular to the actuating axis, in particular to the rotational actuating axis or to the translational actuating axis, of the valve member. In this case, the rail guide can serve as a type of gear for converting the various directions of movement between the adjusting part and the sealing part.

In a further exemplary embodiment of the directional valve according to the embodiments, the protrusion-recess structure has a linear guide rail on the sealing part or adjusting part and a guide carriage of complementary shape thereto on the adjusting part side or sealing part. The guide rail and/or the guide carriage can/can each be made in one piece with the sealing part or the adjusting part, respectively. On the one hand, the form-complementary rail-carriage structure can be manufactured in a simple manner and, on the other hand, it provides a specific assembly of the sealing part and the adjusting part and further provides a direct guide during the relative movement of the adjusting part with respect to the sealing part.

According to a further exemplary embodiment of the directional valve according to the embodiments, the guide rail has an asymmetrical, in particular substantially cruciform, cross-section. Due to the asymmetry, incorrect assembly is avoided. For example, the adjusting part can have a cruciform guide rail oriented transversely to the rotational actuation axis or translational actuation axis, onto which the adjusting part guide carriage, which is designed, for example, as a shape-complementary, cruciform recess, by means of which the adjusting part is pushed or placed onto the guide rail.

According to a further exemplary embodiment of the directional valve according to the embodiments, the slotted link guide and the rail guide are coupled to one another, in particular matched to one another. The slotted link guide and the rail guide can be coordinated with one another in such a way that the rail guide reacts to the slotted link guide in order to engage in the sealed-contact operating state and in order to engage in the release operating state, which is shifted back with respect to the sealed-contact operating state. The directional valve may be configured, or the slotted link guide and the rail guide may be coordinated and/or coupled, such that the slotted link guide activates the rail guide.

According to an exemplary further development of the directional valve according to the embodiments, the slotted link guide is configured to activate the rail guide for engaging the sealing contact operating state. This can be realized in that the slotted link guide causes the sealing part to be displaced relative to the adjusting part and to be pushed into sealing contact with the valve housing. The engagement of the sealing contact operating state can, for example, take place in such a way that the sealing part is displaced relative to the adjusting part and is pushed in the direction of the valve member to build up a sealing contact pressure and in the opposite direction to leave the sealing contact operating state and engage in the release operating state.

According to a further exemplary further development of the directional valve according to the embodiments, the sealing part performs an eccentric movement along the slotted link path when the valve member is set. For example, the sealing part performs an eccentric movement in such a way that the sealing part is pushed into the sealing contact operating state, in particular by a track switch or a press-on protrusion, and is shifted back out of the sealing contact exclusively under the influence of the fluid pressure. For example, the sealing part has the previously described guide protrusion acting as a sliding block and cooperating with the guide groove in the valve housing. Depending on the rotational position of the rotary valve member or depending on the axial position along the translational actuation axis and depending on whether or not the guide protrusion of the sealing part is located in the area of a track switch or a press-on protrusion, the sealing part is pushed into a sealing contact pressure state with the valve housing or is shifted back therefrom. The rail guide and the slotted link guide may be coordinated such that the sealing part is respectively pushed into sealing contact with the valve body in the region of fluid openings to be closed, for example, to shut off or reduce fluid flow.

According to a further aspect of the embodiments, which may be combined with the preceding aspects and exemplary embodiments, there is provided an motor vehicle directional valve, in particular an motor vehicle thermal management valve, such as an motor vehicle coolant valve, that may be configured, for example, according to any of the previously described aspects or exemplary embodiments, for adjusting a fluid flow, such as a coolant flow.

The motor vehicle directional valve includes a valve housing having at least two fluid openings. The valve housing may define a valve chamber through which the fluid flow may be passed and/or in which a valve member may be movably mounted for adjusting the various operating states. The valve housing can have at least two, in particular three or four, fluid connections, such as openings or passages, in particular at least one fluid inlet and at least one fluid outlet. For example, the motor vehicle directional valve is a multi directional valve, in particular an motor vehicle 3/2-directional or motor vehicle 4/2-directional valve.

Further, the motor vehicle directional valve comprises a valve member that is adjustable between a closed state in which the valve member is pushed into sealing contact with the valve housing to fluid-tightly close one of the fluid openings, and an open state in which the valve member is recessed away from the valve housing to at least partially open the fluid opening.

In an exemplary embodiment, which is applicable to all of the previously described aspects or exemplary embodiments of directional valves or motor vehicle directional valves according to the embodiments, the valve member is configured free of a fluid passage. In other words, the valve member may be configured such that when a fluid flow is allowed to pass through the directional valve, i.e., when the directional valve is in an open state, the fluid flow passes the valve member. For example, the valve member has an at least sectional rotational outer contour so that the lowest possible dynamic pressure is formed and/or the fluid flow can flow past the valve member with as little friction as possible.

According to a further aspect of the embodiments, which can be combined with the preceding aspects and exemplary embodiments, there is provided an motor vehicle fluid flow control system, in particular an motor vehicle thermal management fluid flow control system, such as an motor vehicle cooling circuit. The motor vehicle fluid flow guidance system comprises a directional valve according to the embodiments, for example according to one of the aspects or exemplary embodiments described above. Further, the fluid flow routing system may be connected to a fluid source, such as a coolant reservoir, and/or a motor vehicle component to be cooled, such as an engine component or a motor vehicle battery.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, embodiments, like any reference numerals, may correspond throughout the different drawings.

DETAILED DESCRIPTION OF THE EMBODIMENTS

In the following description of exemplary embodiments on the basis of the accompanying figures, a directional valve according to the embodiments, which is in particular a motor vehicle directional valve for adjusting a fluid flow, such as a coolant flow in a motor vehicle, in particular a motor vehicle engine, is generally provided with the reference numeral 1.

Figure 1:
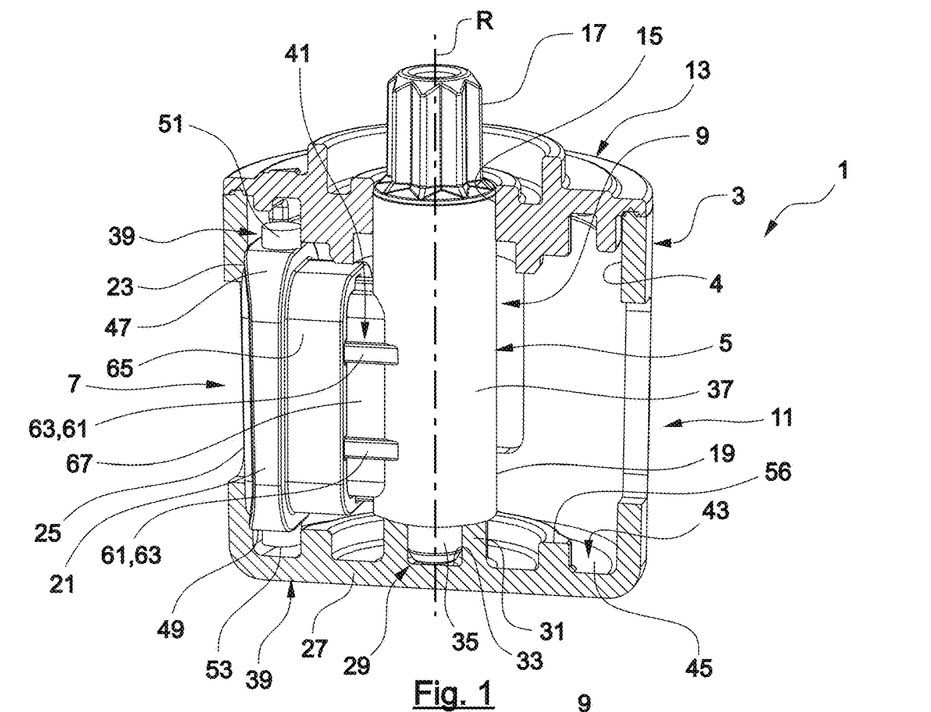
FIG. 1 is a section of a perspective view of an exemplary embodiment of a directional valve according to the embodiments.

The directional valve 1 according to FIG. 1 essentially comprises the following main components: a valve housing, through which a fluid flow is flowable; and an adjustable valve member 5, which according to the exemplary embodiment is realized as a rotary piston, which is rotatable with respect to a rotational adjustment axis R for adjusting different operating states of the directional valve 1.

The valve housing 3 comprises a plurality of fluid connections or fluid openings 7, 9, 11, of which at least one fluid inlet and one fluid outlet are present. FIG. 1 shows that the valve housing 3 is open at the top and is sealed, in particular fluid-tight, by means of a valve cover 13. The fluid cover 13 has a central passage opening 15 through which the valve member 5 extends in a fluid-tight manner and in which it is rotationally mounted so that the valve member 5 can be coupled in a force-transmitting manner to an actuator not shown. The actuator is necessary to apply the actuating force for actuating the valve member 5, which is required to set the various operating states of the directional valve 1. At an end of the valve member 5 projecting from the valve cover 13, the latter can form a force transmission part 17 associated with the actuator.

In the exemplary embodiment according to FIG. 1, the valve member 5 comprises an adjusting part 19 to be coupled to an adjusting part in a force transmission manner, which adjusting part 19 has the force transmission part 17, and a sealing part 21 movable relative to the adjusting part 19, which sealing part 21 is designed for the purpose of a sealing contact operating state, in which the sealing part 21 closes one of the fluid openings 7, 9, 11 in a fluid-tight manner, and also a release operating state, in which the sealing part 21 opens the fluid openings 7, 9, 11, so that a fluid flow through the respective openings 7, 9, 11 is permitted. The sealing part 21 has a seal 25, such as an earring seal, on an end sealing surface 23 which is oriented radially outwards with respect to the rotational actuation axis R and which serves as a sealing face, in order to achieve an improved fluid-tight closure of the fluid openings 7, 9, 11. The relative mobility for changing between sealing contact operating state and release operating state, will be discussed further below.

The valve housing 3, which is rotationally shaped and has essentially a cup shape, has a closed valve housing base 27. A central pivot bearing 29 for the valve member 5, in particular its adjusting part 19, is provided in the valve housing base 27. The pivot bearing 29 comprises a bearing recess 33, which is bounded in particular by a circumferential wall 31 and into which a bearing journal 35 of the sealing part 21 extends. The bearing journal 35 is rotatable received within the bearing recess 33. Further, the bearing journal 35 is oriented substantially concentrically with respect to a shaft 37 of the adjusting part 19 extending along the rotational actuation axis R.

The engagement of the sealing contact operating state for fluid-tight closure of the fluid openings 7, 9, 11 as well as also the release of the individual fluid openings 7, 9, 11, i.e. The engagement of the release operating state, is achieved via a coupling and matching of a slotted link guide 39 and a rail guide 41. The slotted link guide 39 serves to push the valve member 5, in particular the sealing part 21, into the sealing contact operating state with the valve housing 5 and to guide the valve member 5, in particular the sealing part 21, out of the sealing contact operating state into a reset release operating state.

The rail guide 41 thereby acts as a kind of gear for converting a change in movement imposed by the slotted link guide into a displacement of the sealing part 21. The slotted link guide 39 has a slotted link path 43 formed in the valve housing 3, namely the valve housing base 27, and made in one piece with the valve housing 5, in which the valve member 5, in particular the sealing part 21, is guided. The slotted link path 43 is formed by a guide groove 45 formed in the valve housing 3, which is oriented in the circumferential direction with respect to the rotational actuation axis R. The guide groove 45 forms a closed ring in the circumferential direction so that the sealing part 21 guided therein can be continuously adjusted 360°. The sealing part 21 is guided and supported within the guide groove 45 by means of a guide protrusion 51, 53 provided on an top side 47 oriented in the direction of the rotational adjustment axis R and on the opposite bottom side 49 of the sealing part 21. It is also conceivable that the sealing part 21 has only a single guide protrusion 51, 53. The guide protrusion 51, 53 projects into the guide groove 45 in the direction of the rotational setting axis R and slides along the guide groove 45 in the radial direction during a rotational setting movement of the valve member 5. In this case, the guide protrusion 51, 53 acts as a sliding block and cooperates with the guide groove 45 to support and guide the valve member 5. In accordance with the embodiments, a directional valve with significantly reduced friction between the valve member 5 and the valve housing 3 is provided in a structurally simple manner, so that wear on the components is significantly reduced and less expensive actuators can be used, while at the same time ensuring sufficient tightness the sealing contact operating state. The advantages are achieved, among other things, by applying a particularly radial contact pressure for sealing the fluid openings 7, 9, 11 only when it is necessary, i.e. when the directional valve 1 is switched in such a way that a fluid opening 7, 9, 11 is to be closed.

Figure 2:
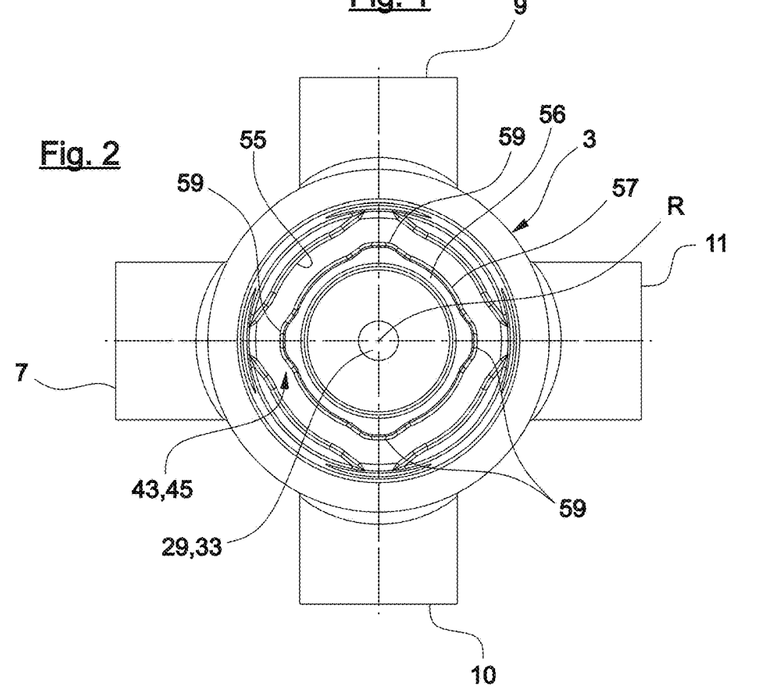
FIG. 2 is a top view of a valve housing of the directional valve according to FIG. 1.

FIG. 2 shows a top view of a valve body 3, from which the baffle guide 39 can be seen. According to FIG. 2, the guide groove defining the slotted link path 43 extends in the circumferential direction and concentrically with respect to the rotational actuation axis R and is bounded by two groove walls 55, 57 spaced apart in the radial direction. The radially inner groove wall 55 is part of a circumferential web 56 or protrusion which forms or bounds the guide groove 45. The guide protrusion 53, 51 may be shape-matched with respect to a cross-section, particularly a radial cross-section, of the guide groove 45 so that when the valve member 5 is positioned and the guide protrusion 51, 53 travels along the slotted link path 43, the guide protrusion 53, 51 may be in sliding contact with the groove walls 55, 57. The guide groove 45 is adjusted, or the sealing part 21 and the guide groove 45 are adjusted to each other, so that when the valve member 5 is moved in the area between each two adjacent fluid openings 7, 9, 10, 11, there is no radial contact pressure and thus no radial frictional resistance between the sealing part 21 and the valve housing 3. In other words, the guide groove 45 is dimensioned such that the sealing part 21 is shifted back radially inwards with respect to a sealing contact operating state in which the sealing part can come into fluid-tight sealing contact with the valve housing 3, so that there is no frictional contact between the sealing part 21 and the valve housing 3. Thus, there is a radial distance between sealing part 21 and valve housing inner wall 4.

To ensure sufficient sealing contact for fluid-tight closure of the fluid openings 7, 9, 10, 11, the guide groove in the exemplary embodiment according to FIG. 2 has four points or press-on protrusions 59 distributed in the circumferential direction with respect to the rotational setting axis R. The press-on protrusions 59 are arranged on the radially inner groove wall 57 and extend radially outwards with respect to the rotational setting axis R. Furthermore, one press-on protrusion 59 each is associated with one fluid opening, 7, 9, 10, 11, and is oriented concentrically with respect to a central axis through the respective fluid opening 7, 9, 10, 11, so that, for engaging the sealing contact operating state in the course of a rotational actuating movement of the valve member 5 about the rotational actuating axis R, the sealing part 21 is pushed radially outwardly by the press-on protrusions 59 in the direction of the valve housing 3 in order to build up a radial contact pressure for fluid-tight closure of the respective fluid openings 7, 9, 10, 11. Accordingly, the press-on protrusions 59 cause the sealing part 21 to be deflected or deflected transversely, in particular radially, with respect to the axis of rotational adjustment. The relative movement option of the sealing part 21 relative to the adjusting part 19 is realized, as already described, by means of the rail guide 41.

Referring again to FIG. 1, it can be seen that the rail guide 41 is implemented on a protrusion-recess structure on the adjusting part 19 and sealing part 21, which, according to FIG. 1, has a straight guide rail 61 on the adjusting part, which, according to FIG. 1, is formed by a pair of guide rail elements extending in parallel, and comprises a guide carriage 71 on the sealing part, which is complementary in shape to the guide rail 61. According to FIG. 1, the guide carriage 71 is arranged on an inner side of a guide component 65 facing and associated with the adjusting part 19 by means of a recess which is adapted in shape with respect to the guide rail 61, which guide component 65 is adapted in shape with respect to a guide part 67 on the adjusting part facing and associated with the sealing part 21 and is pushed or plugged onto the latter. As a result of the fact that the press-on protrusions 59 are assigned to and face the fluid openings 7, 9, 10, 11, the adjusting part 19 is pushed radially outwards by the press-on protrusions 59 and by means of the guide rail-guide carriage structure on the adjusting part 19 and the sealing part 21 to engage the sealing contact operating state in order to build up a radial contact pressure.

Figure 3:
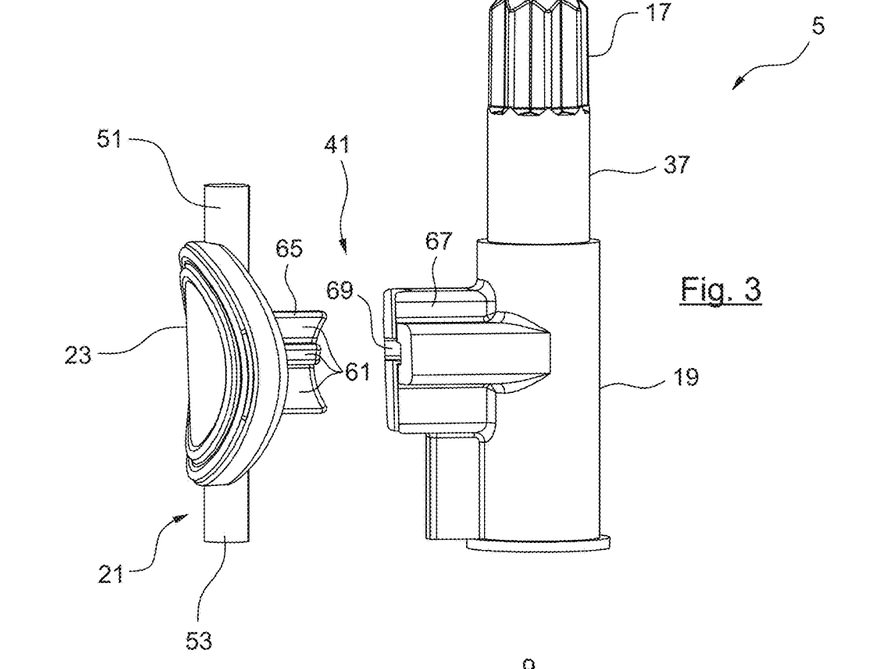
FIG. 3 is a perspective view in exploded view of a valve member of a further exemplary design of a directional valve according to the embodiments.

FIG. 3 is another exemplary embodiment of a two-part valve member for a directional valve 1 according to the embodiments. For clarity, the sealing part 21 and the adjusting part 19 are configured in a disassembled state relative to each other. The essential difference between the embodiment according to FIG. 3 and the embodiment according to FIG. 1 is the realization of the rail guide 41. While in the embodiment according to FIG. 1 the sealing part 21 is pushed by means of the guide component 65 on the adjusting part onto an associated guide part 67 of the adjusting part or placed on it from the outside, the guide component 65 according to FIG. 3 is designed in such a way that it is pushed into an associated recess 69 in the force transmission part of the adjusting part 19.

For example, the guide component 65 can have a cross-shaped cross-section, in particular an asymmetrical cross-section. The same applies to the recess 69, so that incorrect assembly is prevented. In FIG. 3, the webs of the cruciform cross-section form the respective guide rails 61 of the rail guide 41. The recess 69, which is cruciform in cross-section and has a complementary shape, has associated guide cradles which slide along one another during a relative movement of the sealing part 21 and the adjusting part 19. It should be understood that it is also possible, for example, for the guide component 65 and the guide part 67 of sealing part 21 and adjusting part 19, respectively, to be of exactly the opposite design, so that the guide part 67 of adjusting part 19 comprises the cruciform guide rails 61, while the guide component 65 comprises the circular guide cradles, so that in turn guide part 67 of adjusting part 19 is pushed or inserted into guide component 65 of sealing part 19.

Figure 4:
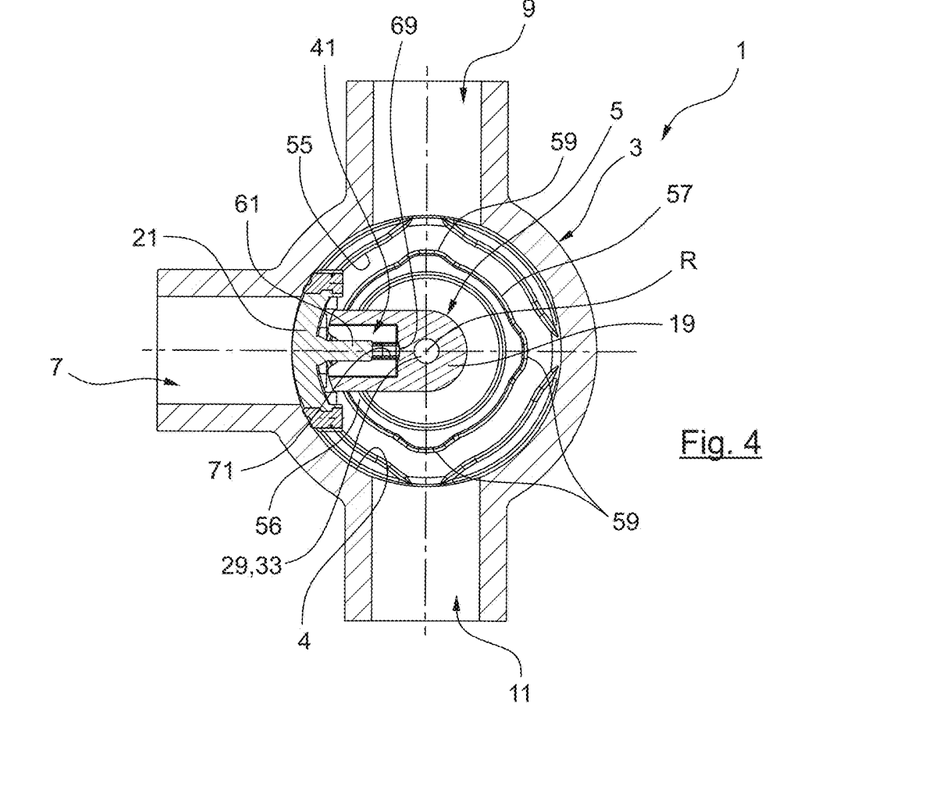
FIGS. 4-6 are schematic representations of various operating states of an exemplary version of a directional valve according to the embodiments.
Figure 5:
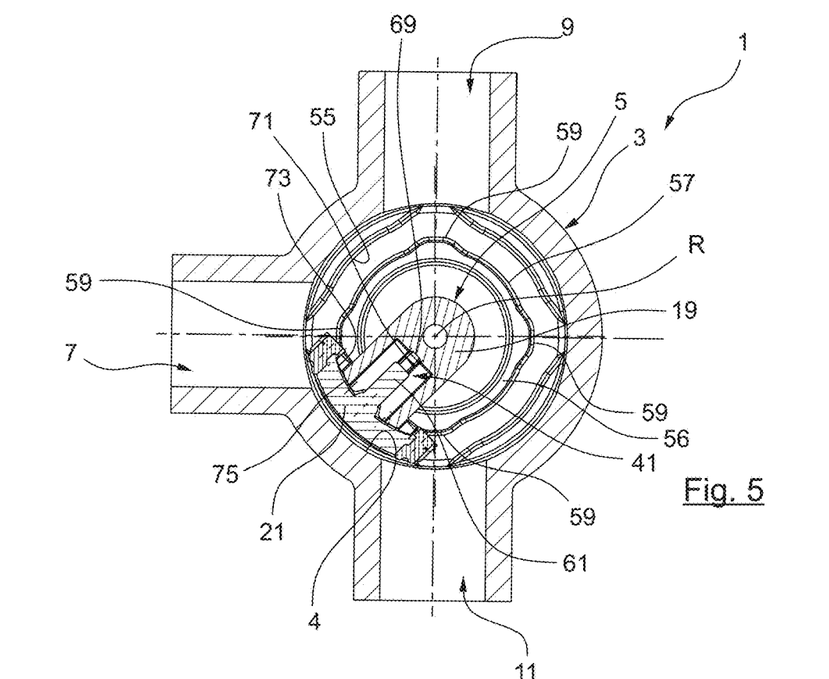
Figure 6:
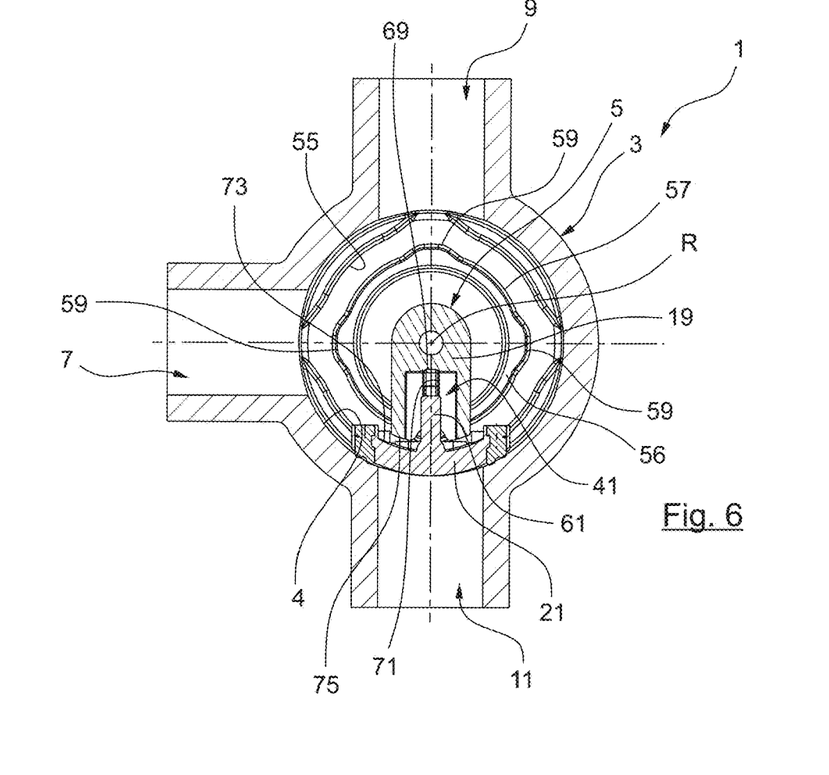

FIGS. 4 to 6 show, analogously to FIG. 2, a schematic top view of a valve housing 3 which, in contrast to the embodiment according to FIG. 2, has only three fluid connections 7, 9, 11, and in which a valve member 5, designed for example according to FIG. 3, is arranged. FIGS. 4 to 6 show different operating states based on the different rotational positions of the valve member 5 within the valve housing 3. FIGS. 4 to 6 show a rotational switching movement of the valve member 5 from a sealing contact operating state, in which the fluid opening 7 is closed fluid-tight (FIG. 4), to a sealing contact operating state with respect to the fluid opening 11 (FIG. 6). FIG. 5 shows a pivoted state in which all fluid openings 7, 9, 11 are at least partially uncovered.

A synopsis of FIGS. 4 to 6 shows the interaction of slide guide 39 and rail guide 42 according to the embodiments. The sealing contact operating state according to FIG. 4, the sealing part 21 is pushed radially outward into sealing contact with the valve housing inner wall 4 with respect to the adjusting part 19 by the slotted link guide 39 and by means of the rail guide 41, in order to build up a radial contact pressure with respect to the valve housing inner wall 4, so that the fluid opening 7 is closed as fluid-tightly as possible. As already mentioned, the radially outward urging of the sealing part 21 relative to the adjusting part 19 is effected by the cooperation of link guide 39 and rail guide 41. The guide protrusion 53 of the sealing part 21, which is guided within the guide groove 45 and accommodated therein, is deflected radially outward in a form-fitting manner by means of the press-on protrusion 59, which is associated with the fluid opening 7, as a result of which the corresponding guide rails and guide carriages on the sealing part and closing part slide along one another via the rail guide 41 in order to move the entire sealing part 21 radially outward. The increased radial distance between the sealing part 21 and the rotational actuating axis R can be seen, for example, by the radial distance of the sealing part guide rail 61 relative to the adjusting part 19 within the recess 69, which forms the guide carriage 71, compared to the design shown in FIG. 5, in which the valve member is shown in the pivoting range between two sealing contact closing states.

In FIG. 5, it can be seen that the sealing part 21 is recessed radially inward. This can be seen, on the one hand, from the fact that there is a radial distance between the valve housing inner wall 4 and the sealing/contact surface 23 and, furthermore, from the fact that radially on the inside, an inner side 73 of the sealing part 21 opposite the sealing/contact surface 23 has clearly approached a stop surface 75 of the adjusting part 19, which is formed by an end wall bounding the recess 69. Furthermore, it can be seen within the recess 69 that the guide rail 61 is offset back radially inwards. This is related to the fact that the guide protrusion 53 guided in the guide groove 45 continues to follow the guide groove walls 55, 57 of the guide groove 45 defining the slotted link path 43, which are offset radially inwardly relative to the press-on protrusions 59 in a pivoting region between two adjacent fluid openings 7, 9, 11, so that the guide protrusion 53 and consequently the entire sealing part 21 are also offset radially inwardly.

It is also conceivable, for example, that the radial backward displacement of the sealing part 21 takes place in particular exclusively under the influence of the acting fluid pressure when a fluid opening 7, 9, 10, 11 is opened. The operating state according to FIG. 6 is to be understood analogously to the sealing contact operating state according to FIG. 4, whereby in FIG. 6 another fluid opening, namely the fluid opening 11, is closed in a fluid-tight manner. The operation for forming the sealed-contact operating state is carried out in an analogous manner. In all valve states according to FIGS. 4 to 6, it can be seen that the valve member 5 does not have a fluid passage through which the fluid flow passes in an opening or release state of the valve member. The fluid flow within the valve housing 5 flows completely past or around the valve member 5.

Figure 7:
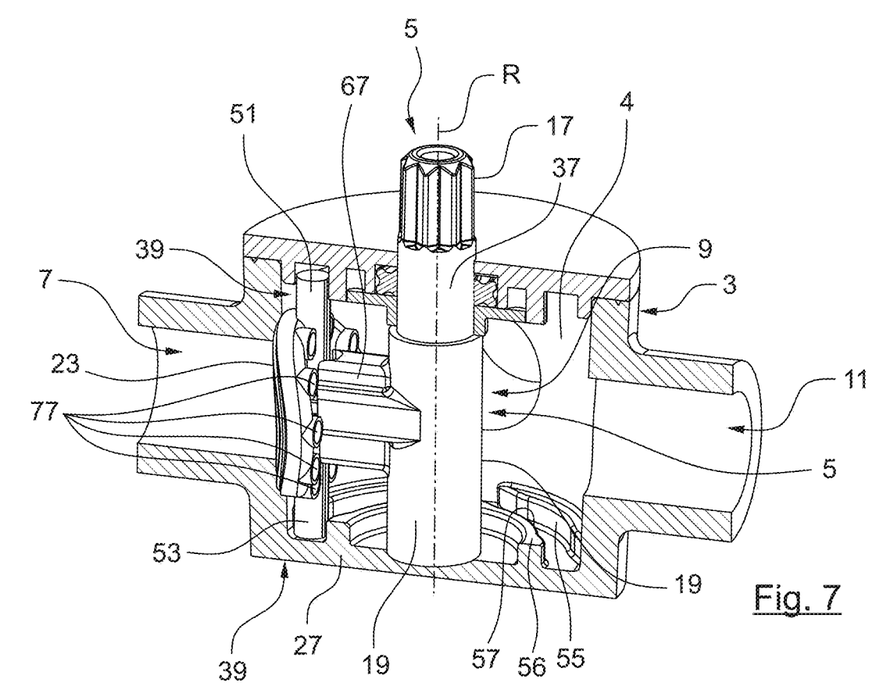
FIG. 7 is a section of a perspective view of an exemplary further embodiment of a directional valve according to the embodiments.

FIG. 7 shows a schematic representation in a similar perspective as in FIG. 1 of a further exemplary embodiment of a directional valve 1 according to the embodiments. The embodiment according to FIG. 7 differs from the embodiment according to FIG. 1 essentially by the embodiment of the rail guide 41, which is realized according to FIG. 7 corresponding to the embodiment of the valve member 5 from FIG. 3. Furthermore, it can be seen in FIG. 7 that the slotted link guide 39 is realized according to the embodiments in FIGS. 2 and 4 to 6.

The slotted link guide according to FIG. 1 is to be understood in such a way that the sealing part 21 is moved back radially inwards when leaving the sealing contact operating state (FIG. 4; FIG. 6) essentially exclusively under the influence of the fluid pressure of the incoming fluid flow in order to reduce, in particular to prevent, the frictional contact between the sealing part 21 and the valve housing inner wall 4. In FIG. 7, the guiding of the sealing part 21 from the sealing contact operating state into the radially recessed release operating state is supported by the correspondingly shaped radially outer guide groove wall 55 (see in particular FIG. 2). In this respect, the sealing part 21 is here also pushed out of the sealing contact operating state in the direction of the release operating state.

In FIG. 7, it can also be seen that the sealing part 21 is configured differently from the sealing part 21 according to FIG. 1 with respect to the accommodation of a sealing element. The sealing part 21 has passage openings 77 oriented substantially radially with respect to the rotational axis R, and through which a sealing part can be mounted from the radially outer sealing/contact surface 23. The seal may be injected or inserted, for example, with the passage openings 77 serving to allow elastomeric material to be injected and bonded into the passage openings 77, particularly during injection of, for example, an elastomeric seal. The passage openings 77 can also have an undercut with respect to the injection or insertion direction for positive and/or non-positive coupling of sealing part 21 and sealing element.

Figure 8:
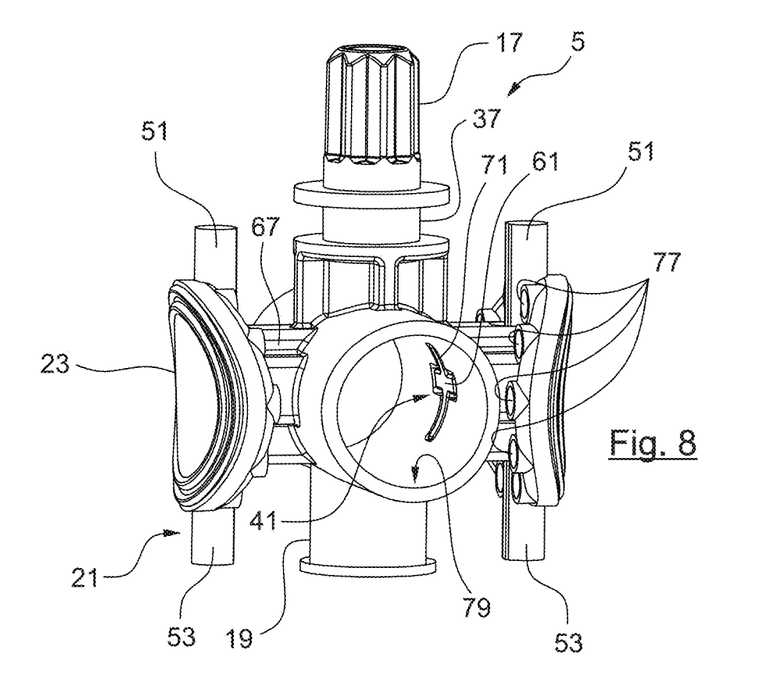
FIG. 8 is a perspective view of a further exemplary embodiment of a valve member of an embodiment of a directional valve according to the embodiments.
Figure 9:
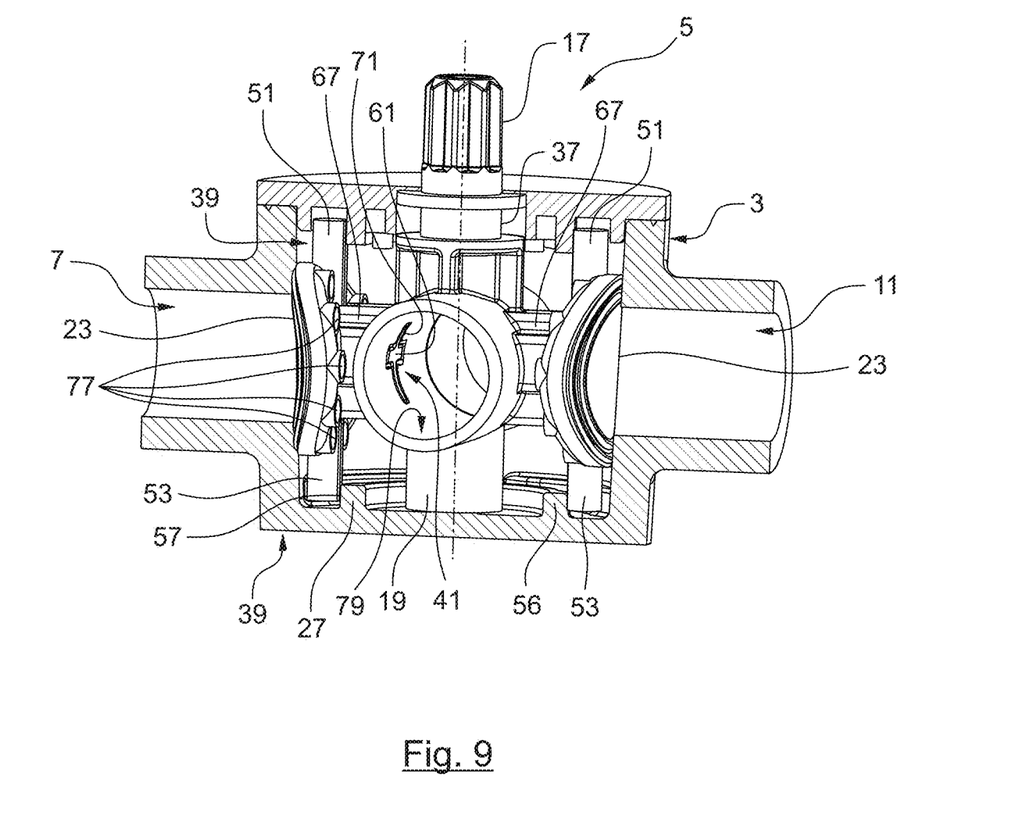
FIG. 9 is a section of a perspective view of a directional valve comprising the valve member according to FIG. 8.

FIGS. 8 and 9 show a further exemplary embodiment of a valve member 5, which according to FIG. 9 is used in a further exemplary directional valve 1 of the embodiments and is accommodated within a valve or fluid housing 3. In contrast to the preceding embodiments, the valve member 5 has two sealing parts 21 opposite each other in the radial direction with respect to the rotational actuating axis R, in particular of identical shape, which are coupled to each other by means of a matching rail guide 39 in order to realize in each case a possibility of relative movement of the two sealing parts 21 with respect to the single, central adjusting part 19. The valve member 5 according to FIGS. 8 and 9 is particularly suitable for a 4/2-directional valve, wherein two opposing fluid openings 7, 9, 10, 11 can be closed simultaneously by means of the valve member 5. By means of the valve member 5 designed in this way, in each case two opposite fluid openings 7, 9, 10, 11 are closed and the two further opposite fluid openings 7, 9, 11, 10 are released. In other words, the permitted fluid flow through the valve housing 3 takes place in a straight line via two fluid openings 7, 9, 10, 11, which are in particular aligned opposite each other.

For guiding the fluid flow through the valve housing 3 and, in particular, through the valve member 5, in particular without flow loss, the valve member 5 according to FIGS. 8 and 9 comprises a central fluid passage 79 which fluidically connects the two fluid openings 7, 9, 10, 11 to be released. An opening cross-section of the fluid passage 79 may be shape-matched with respect to an opening cross-section of the fluid openings 7, 9, 10, 11 of the fluid housing 3. The fluid passage 79 is oriented transversely, in particular perpendicularly, on the one hand with respect to the rotational actuation axis R and on the other hand with respect to the direction of relative movement of the two adjusting parts 21 with respect to the adjusting part 19. In FIG. 9 it can be seen that when the valve member 5 is pivoted or adjusted, a guide protrusion 53 of each of the two sealing parts 21 is accommodated within the guide groove 45 in the valve housing 3 defining the slotted link path 43 and slides along within the guide groove 45 when the valve member 5 is adjusted. Due to the matching of the slotted link guide 39 and the rail guide 41, which is also present in this embodiment, the two sealing parts 21 are simultaneously pushed radially outwardly into the sealing contact operating state with the respective fluid opening 7, 9, 10, 11 by a respective press-on protrusion 59 associated with each of the two opposing fluid openings 7, 9, 10, 11 to be closed. Leaving the sealing contact operating state also occurs analogously and simultaneously for both sealing parts 21.

The features disclosed in the foregoing description, the figures and the claims may be of importance both individually and in any combination for the realization of the various embodiments.

LIST OF REFERENCES 1 directional valve
3 valve housing
4 valve housing inner wall
5 valve member
7, 9, 10, 11 fluid opening
13 cover
15 passage opening
17 force transmission part
19 adjusting part
21 sealing part
23 sealing surface
25 seal
27 valve housing base
29 bearing
31 circumferential wall
33 recess
35 bearing journal
37 shaft
39 slotted link guide
41 rail guide
43 slotted link path
45 guide groove
47 top side
49 bottom side
51, 53 guide protrusion
55, 57 groove wall
56 circumference land
59 press-on protrusion
61 guide rail
63 guide rail element
65 guide component of sealing part
67 guide component of the adjusting part
69 recess
71 guide carriage
73 Inner side
75 arrestor contact surface
77 passage opening
79 fluid passage

The invention claimed is:
1. A directional valve for adjusting a fluid flow between at least two operating states, the directional valve comprising:

a valve housing;
an adjustable valve member; and
a slotted link guide configured to: push the valve member into a sealing contact operating state with the valve housing, and guide the valve member into a releasing operating state shifted back with respect to the sealing contact operating state, wherein the slotted link guide includes a slotted link path formed in a valve housing base, and made in one piece with the valve housing, the adjustable valve member being guided by the slotted link guide.

2. The directional valve according to claim 1, wherein the slotted link path, when engaging the sealing contact operating state, extends such that the valve member is deflected radially with respect to its to a rotational adjusting axis of the valve member in a direction of a sealing contact surface of the valve housing.

3. The directional valve according to claim 2, wherein the slotted link guide has a plurality of press-on protrusions arranged at a distance from one another, which extend into the slotted link path, such that when the valve member travels over at least one of the press-on protrusions, the valve member is pushed by that at least one of the press-on protrusions into the sealing contact operating state.

4. The directional valve according to claim 1, wherein the slotted link path is formed by a guide groove, wherein the valve member has a guide protrusion acting as a sliding block and cooperating with the guide groove.

5. The directional valve according to claim 4, wherein the guide groove is annular in shape with respect to the rotational adjusting axis (R) of the valve member and has a track switch distributed in the circumferential direction, which deflects the valve member out of the annular slotted link path for engaging the sealing contact operating state, and wherein the valve member is formed as a rotary piston.

6. A directional valve for adjusting a coolant flow between at least two operating states, the directional valve comprising:
a valve housing having a slotted link path made in one piece with the valve housing and formed in a base of the valve housing;
a valve member having: an adjusting part to be connected to an actuator in a force-transmitting manner, and a sealing part configured to make sealing contact with the valve housing, the sealing part being movably mounted relative to the adjusting part by a rail guide; and
a slotted link guide configured to, based on the slotted link path:
push the valve member into a sealing contact operating state in which the sealing part makes the sealing contact with the valve housing, and
guide the valve member into a releasing operating state.

7. The directional valve according to claim 6, wherein the rail guide is realized by a shape-corresponding protrusion-recess structure on the adjusting part and the sealing part.

8. The directional valve according to claim 6, wherein, in a sealing contact operating state, the valve member is configured to engage the sealing part in sealing contact with the valve housing, and, in a releasing operating state, the valve member is configured to move the sealing part away from the valve housing.

9. The directional valve according to claim 6, wherein the sealing part is movably mounted on the adjusting part in such a way that the sealing part is moved away from the valve housing when leaving the sealing contact under influence of a fluid pressure.

10. The directional valve according to claim 9, wherein an axis of movement of the sealing part is oriented substantially orthogonal to the rotational adjusting axis of the valve member.

11. The directional valve according to claim 7, wherein the protrusion-recess structure has a linear guide rail arranged on the sealing part or on the actuating member, further wherein a guide carriage is arranged on the actuating member or on the sealing part and is complementary in shape.

12. The directional valve according to claim 11, wherein the linear guide rail has an asymmetrical and substantially cruciform cross-section.

13. The directional valve according to claim 12, wherein the slotted link guide and the rail guide are matched to one another.

14. The directional valve according to claim 13, wherein, in the sealing contact operating state, the slotted link guide is configured to displace the sealing part relative to the adjusting part and to push the sealing part into the sealing contact with the valve housing.

15. The directional valve according to claim 14, wherein the sealing part is configured to perform an eccentric movement along the slotted link path when the valve member is set in such a way that the sealing part is pushed into the sealing contact operating state by a track switch or a press-on protrusion, and is shifted back out of the sealing contact under influence of a fluid pressure.

16. A motor vehicle directional valve for adjusting a fluid flow of a coolant, the motor vehicle directional valve comprising the directional valve according to claim 6, wherein:
the valve housing includes at least two fluid openings; and
the valve member is adjustable between a closed state, in which the valve member is pushed into the sealing contact with the valve housing to fluid-tightly close one of the fluid openings, and an open state, in which the valve member is shifted back away from the valve housing to at least partially open the fluid opening.

17. The motor vehicle directional valve according to claim 16, wherein the valve member is free of a fluid passage.

* * * * *